United States Patent
Grant et al.

(10) Patent No.: US 9,466,187 B2
(45) Date of Patent: Oct. 11, 2016

(54) MANAGEMENT OF MULTIPLE WEARABLE HAPTIC DEVICES

(71) Applicant: Immersion Corporation, San Jose, CA (US)

(72) Inventors: Danny Grant, Laval (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 178 days.

(21) Appl. No.: 13/758,251

(22) Filed: Feb. 4, 2013

(65) Prior Publication Data

US 2014/0218184 A1   Aug. 7, 2014

(51) Int. Cl.
*G08B 6/00* (2006.01)
*G06F 1/16* (2006.01)
*G06F 3/01* (2006.01)

(52) U.S. Cl.
CPC ............... *G08B 6/00* (2013.01); *G06F 1/163* (2013.01); *G06F 3/016* (2013.01)

(58) Field of Classification Search
CPC ........ G06F 1/163; G06F 3/011; G06F 3/016; G08B 6/00
USPC ............... 340/407.1; 345/156, 633; 715/702
See application file for complete search history.

(56) References Cited

U.S. PATENT DOCUMENTS

| | | | |
|---|---|---|---|
| 5,433,211 A * | 7/1995 | Brammer | A61B 5/4827 600/552 |
| 5,744,953 A * | 4/1998 | Hansen | A61B 5/1036 324/207.17 |
| 6,088,017 A * | 7/2000 | Tremblay | G06F 3/011 345/156 |
| 6,275,213 B1 | 8/2001 | Tremblay et al. | |
| 7,839,269 B2 | 11/2010 | Steger et al. | |
| 8,031,172 B2 | 10/2011 | Kruse et al. | |
| 8,217,769 B2 | 7/2012 | Ullrich et al. | |
| 2002/0008626 A1 * | 1/2002 | Waters et al. | 340/573.1 |
| 2002/0013144 A1 | 1/2002 | Waters et al. | |
| 2002/0126026 A1 * | 9/2002 | Lee et al. | 341/22 |
| 2004/0042629 A1 * | 3/2004 | Mellone | H04R 1/1058 381/310 |
| 2005/0132290 A1 * | 6/2005 | Buchner et al. | 715/702 |
| 2007/0139167 A1 | 6/2007 | Gilson et al. | |
| 2008/0094351 A1 * | 4/2008 | Nogami et al. | 345/156 |
| 2008/0294984 A1 * | 11/2008 | Ramsay et al. | 715/702 |
| 2009/0128305 A1 * | 5/2009 | Mortimer | G06F 3/016 340/407.1 |
| 2009/0153350 A1 * | 6/2009 | Steger et al. | 340/825.2 |
| 2010/0134327 A1 * | 6/2010 | Dinh et al. | 341/20 |
| 2011/0025608 A1 * | 2/2011 | Kruglick | G09B 21/003 345/173 |
| 2012/0075167 A1 * | 3/2012 | Lahcanski et al. | 345/8 |
| 2012/0212340 A1 * | 8/2012 | Kruse et al. | 340/539.12 |
| 2014/0142851 A1 * | 5/2014 | Larmo et al. | 701/538 |
| 2015/0141088 A1 * | 5/2015 | Hosoi | H04M 1/035 455/575.1 |

* cited by examiner

*Primary Examiner* — Benjamin C Lee
*Assistant Examiner* — Stephen Burgdorf
(74) *Attorney, Agent, or Firm* — Miles & Stockbridge P.C.

(57) ABSTRACT

A system for managing a plurality of wearable devices on a user receives information to be conveyed using haptic effects and determines an intent of the information. The system then determines, for each of the plurality of wearable haptic devices, a location of the wearable haptic device on the user and a haptic capability. The system then maps the information as a haptic effect to one or more of the wearable haptic devices based at least on the determined locations on the user and the haptic capabilities.

32 Claims, 4 Drawing Sheets

MANAGEMENT OF MULTIPLE WEARABLE HAPTIC DEVICES

FIELD

One embodiment is directed to managing or controlling electronic devices, and in particular to managing wearable electronic devices.

BACKGROUND INFORMATION

As computer-based systems, such as game consoles, appliances, personal computers ("PCs"), servers, personal digital assistants ("PDAs"), cellular phones, "smart phones", global positioning systems ("GPS"), etc., have become more prevalent in recent years, the portability of such systems as well as human-machine interface devices becomes increasingly important. Wearable electronic devices exist in the form of Bluetooth™ ear pieces and intelligent accessories such as helmets, glasses and bracelets. As these types of devices increase in variety, users may begin to wear and utilize many devices on various areas of their body, and these devices need to be controlled and managed.

SUMMARY

One embodiment is a system for managing a plurality of wearable devices on a user. The system receives information to be conveyed and determines an intent of the information. The system then determines, for each of the plurality of wearable devices, a location of the wearable device on the user and a capability. The system then maps the information to one or more of the wearable devices based at least on the determined locations on the user and the capabilities.

DETAILED DESCRIPTION

As discussed above, wearable devices are a developing trend in the consumer market, and these devices can serve to provide haptic feedback to users. "Haptic feedback" or "haptic effects" or "haptic output" can include kinesthetic feedback (such as active and resistive force feedback) and/or tactile feedback (such as vibration, texture, and heat). Examples of wearable devices include wrist bands, headbands, eyeglasses, rings, leg bands, arrays integrated into clothing, etc., or any other type of device that a user may wear on a body or can be held by a user. Some wearable devices can be "haptically enabled", meaning they include mechanisms to generate haptic effects.

In one embodiment, when several wearable devices are worn by a user and state information such as incoming calls, navigational cues or messaging is received, a wearable device haptic manager processes the state information, and determines which one or more of the wearable devices will generate a haptic output. The determination can be based on the functionality or capability of each wearable device, the type of haptic output needed to be generated, and the perceptual limits of the user at the location of each wearable device.

Figure 1:
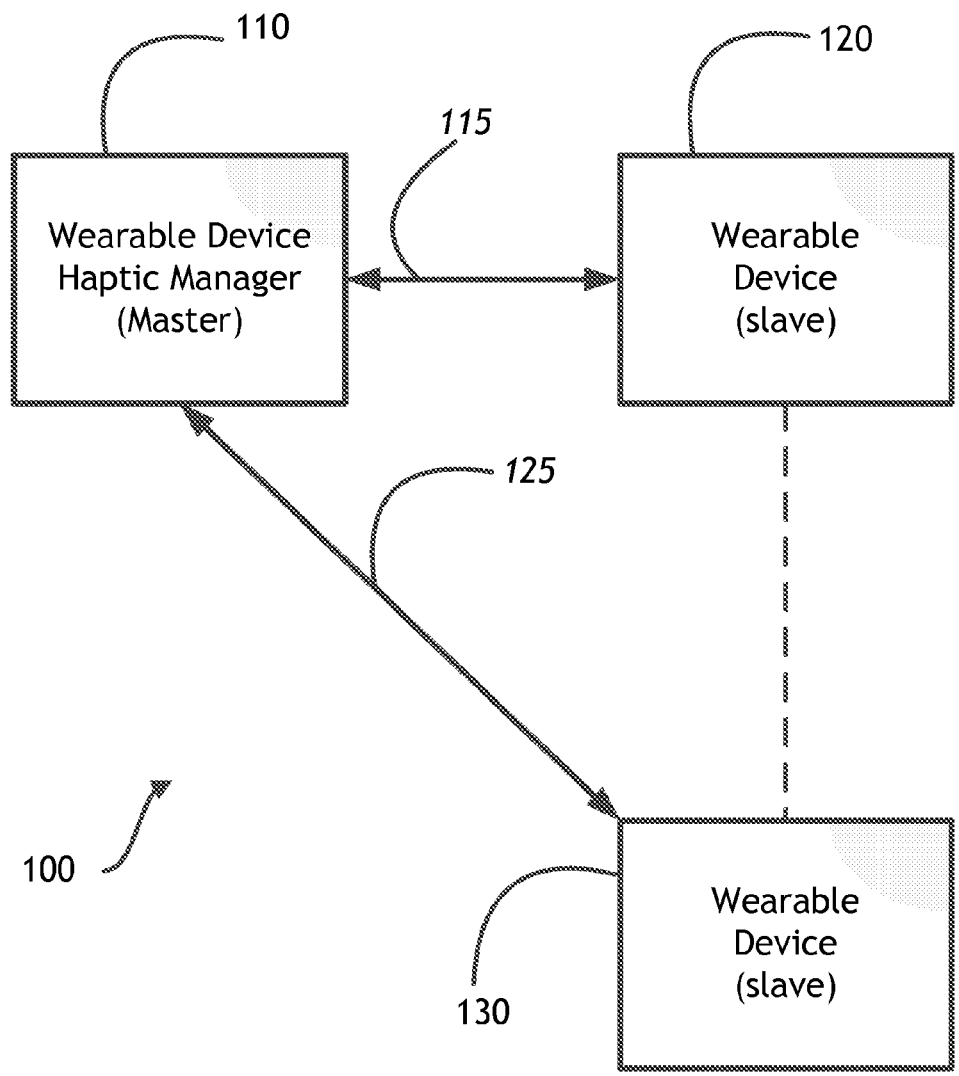
FIG. 1 is a block diagram of a wearable device system in accordance with one embodiment of the present invention.

FIG. 1 is a block diagram of a wearable device system 100 in accordance with one embodiment of the present invention. System 100 includes wearable device haptic manager 110, communication lines 115, 125, and remote wearable devices 120, 130. Lines 115, 125 can be any type of data communication means, including wired or wireless. In one embodiment, wearable device haptic manager 110 functions as a master device while remote wearable devices 120, 130 function as slave devices. Although two wearable devices are shown in FIG. 1, in other embodiments any number of wearable devices may be present and worn by the user.

A "manager layer", which includes wearable device haptic manager 110, intelligently selects which remote wearable device 120, 130 (or more than one of the devices), should generate haptic output to reflect a state or in response to an event. In one embodiment, a user will carry wearable device haptic manager 110 and will wear, in various places on the user's body, wearable devices 120, 130. Examples of embodiments of wearable devices 120, 130 are disclosed in U.S. Pat. No. 8,031,172, entitled "Method and Apparatus for Wearable Remote Interface Device", the disclosure of which is herein incorporated by reference.

In general, wearable device haptic manager 110 is responsible for controlling all of the wearable devices worn by the user. In another embodiment, instead of a master/slave arrangement as shown in FIG. 1, the functionality of wearable device haptic manager 110 can be distributed among one or more of the wearable devices. Further, instead of the user wearing or carrying wearable device haptic manager 110, the functionality can be provided from a remote location such as a gaming console, a smartphone, or remotely from a network or "cloud" implementation.

Figure 2:
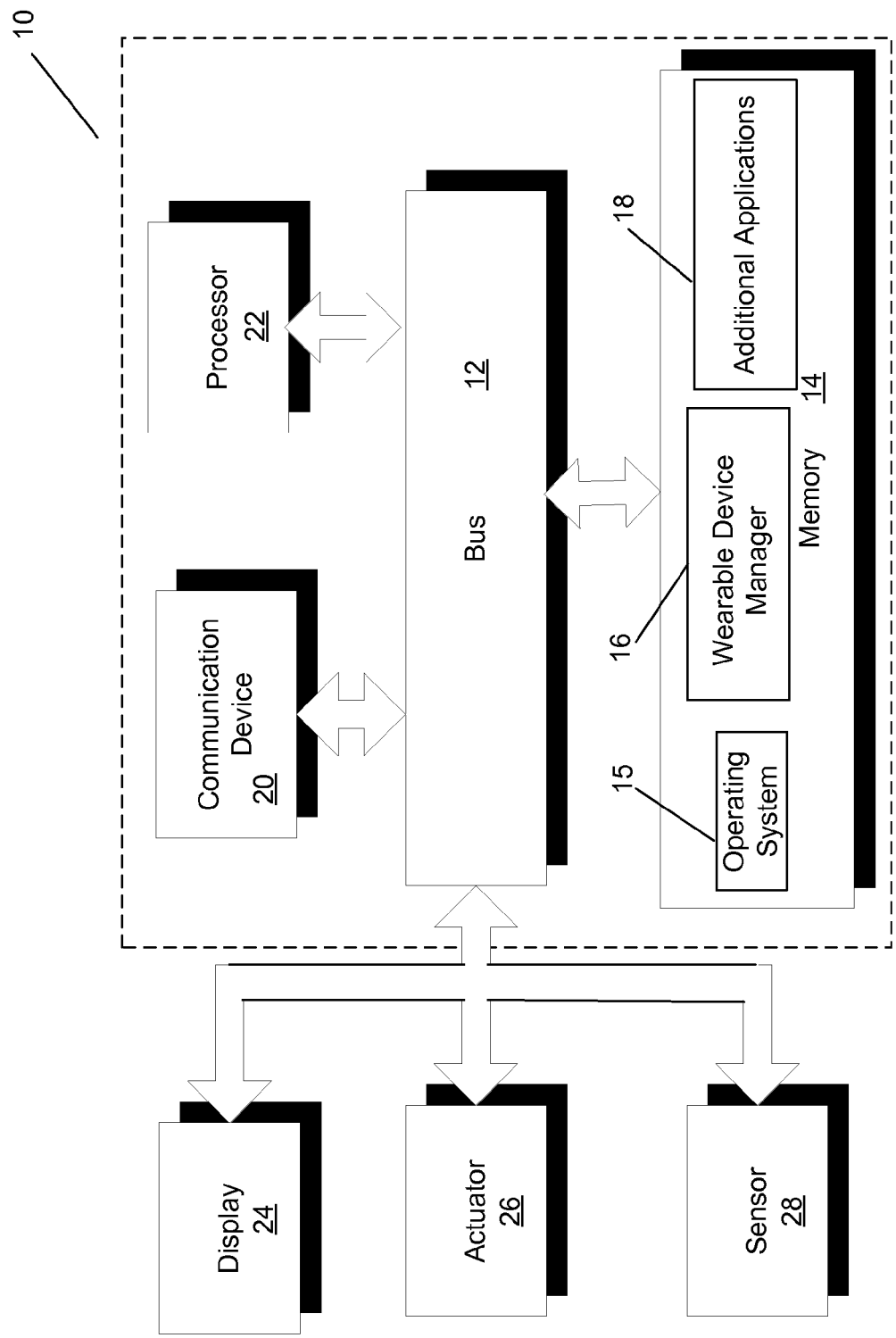
FIG. 2 is a block diagram of a system that can implement a wearable device haptic manager in accordance with one embodiment of the invention.

FIG. 2 is a block diagram of a system 10 that can implement wearable device haptic manager 110 of FIG. 1 in accordance with one embodiment of the invention. A separate embodiment of system 10 can implement any of the other elements shown in FIG. 1 (i.e., the wearable devices) as well as the standalone device manager disclosed in FIG. 4 below. For any of these implementations, all of the elements shown in FIG. 2 may not be needed or present. For example, in general, wearable device haptic manager 110 does not generate its own haptic effects, so the actuator shown in FIG. 2 may not be included when system 10 implements wearable device haptic manager 110. Further, none of the elements may need or include a display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10. The modules further include a wearable device manager module 16 that manages wearable devices, as disclosed in more detail below. System 10 will typically include one or more additional application modules 18 to include additional functionality, such as smartphone related applications (if system 10 is a smartphone), APIs, etc.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem. Communication device 20 can implement the needed functionality for communicating over communication lines 115 and 125 of FIG. 1.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes one or more actuators 26. Processor 22 may transmit a haptic signal associated with a haptic effect to actuator 26, which in turn outputs haptic effects. Actuator 26 may be, for example, an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA").

System 10 further includes one or more sensors 28. Sensors 28 may include an accelerometer, a gyroscope, a Global Positioning System ("GPS") sensor, a touch-sensitive input device (e.g., touch screen, touchpad), a texture stylus, an imaging sensor, or some other type of sensor. Sensors 28 may be configured to detect changes in acceleration, inclination, inertia, or location. Sensors 28 may also include a location sensor, rotary velocity sensor, light sensor, pressure sensor, texture sensor, camera, microphone, or other type of sensor.

Figure 3:
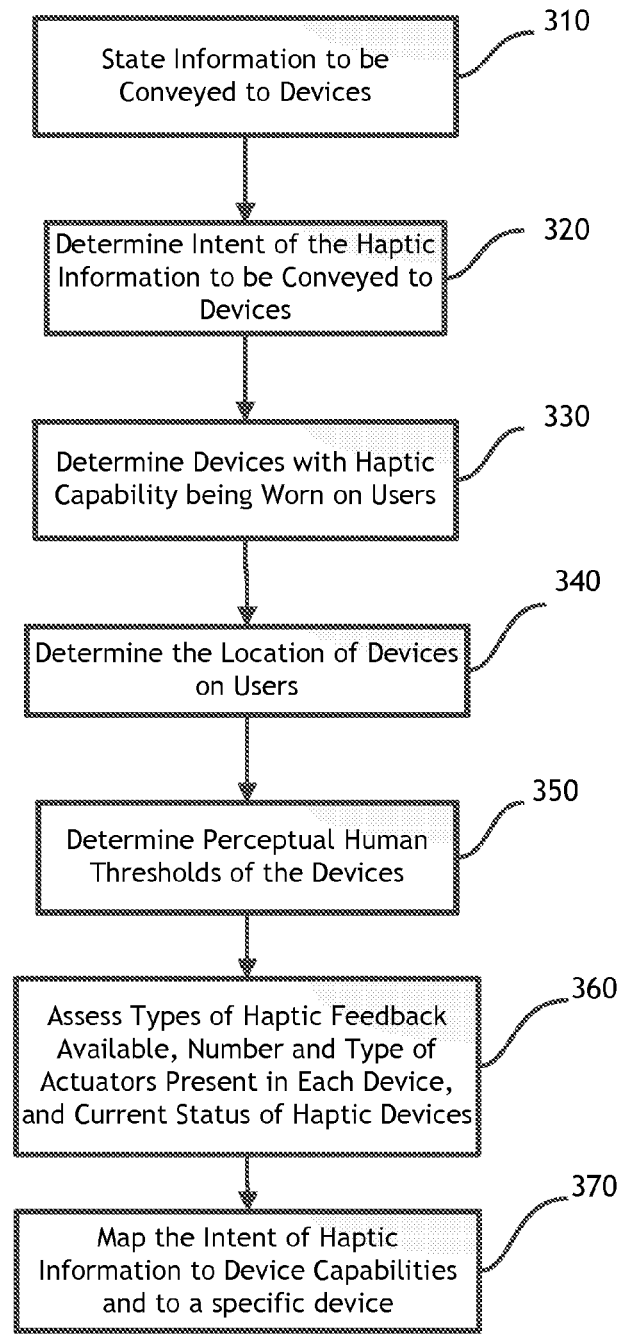
FIG. 3 is a flow diagram of the functionality of the wearable device manager module of FIG. 1 when managing wearable haptic devices in accordance with one embodiment.

FIG. 3 is a flow diagram of the functionality of wearable device manager module 16 of FIG. 1 when managing wearable haptic devices in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Embodiments may perform all of the functionality disclosed in FIG. 3, or a subset of the functionality.

At 310, state or any type of haptic information to be conveyed to the wearable devices is received by haptic manager 110. For example, this information may include incoming calls or messages, ambient information, etc. The information may be generated by haptic manager 110 itself, or received from another device such as a cell phone. The information, in addition or instead of haptic information, may include audio or video content.

At 320, the intent of the haptic information or other information to be conveyed to the wearable devices is determined. For example, the intent may include an alert, a notification, background information, directional information, etc.

At 330, all of the wearable devices that have haptic capabilities (or other capabilities such as being able to play audio or video) and are being worn by a user is determined. For example, haptic capable wearable devices may include devices such as a ring, bracelet, headband, gamepads, etc., or any device that can be worn or held by a user.

At 340, the location on the user of each of the wearable devices is determined. For example, the location may be a user's right wrist, left ankle, finger, etc.

At 350, the perceptual human thresholds for each location of the wearable devices is determined. For example, the determination may recognize that fingertips contain more nerve endings and thus have a high perceptual human threshold for sensation than a person's back or arm areas. Therefore, a wearable device worn on a finger will be associated with a higher perceptual human threshold than a wearable device worn on an arm.

At 360, for each wearable haptic device, the types of haptic feedback available, the number and type of actuators present, and the current status is determined. For example, available haptic feedback may be vibration, deformability, pressure, etc. A current status may be recognizing whether a wearable device is currently playing a haptic effect, etc. Other output capabilities, such as audio and video, may also be determined each device. Further, for audio or video playback functionality, the current status may be determinative of where the audio or video is played. For example, a camera of a smart phone can provide a current status that the user is looking at a wrist display, in which case haptic manager 110 may determine that video should be displayed on the wrist display in conjunction with an incoming call, rather than on some other wearable device.

At 370, the intent of the haptic information is mapped to the capabilities of the wearable devices and to specific wearable devices. For example, wearable device haptic manager 110 can intelligently map the intent of the state information received and convey such information back to one or more specific wearable devices worn by a user. Alternatively, the intent may be mapped to multiple users with multiple wearable devices. Further, audio or video data may also be routed to the appropriate wearable devices, such as a device located on the user's wrist if the user is determined to be looking at a wrist display at 360.

As an example of the functionality of wearable device haptic manager 110, assume a user has recently purchased a haptic enabled wrist watch and a haptic enabled ring as remote wearable devices to compliment his augmented reality haptic enabled glasses. The user, in one embodiment, is also carrying wearable device haptic manager 110. The user's haptic enabled cell phone/smartphone remains his primary commuting device and he always keeps it in his backpack. The user is walking down the street and receives an incoming call. Wearable device haptic manager 110 discerns that it is an urgent call and outputs the haptic effect to all the remote wearable devices 120, 130 that the user has available (e.g., smartphone, ring, watch, glasses, etc.).

In another example, the user is walking down the street and receives an incoming call. Wearable device haptic manager 110 discerns that it is a friend calling and outputs the haptic effect to the user's watch using pressure based haptic effects.

In another example, the user queries for directions and receives turn-by-turn information wirelessly from a remote location (e.g., the "cloud"). Wearable device haptic manager 110 is aware that the user is wearing his watch on his right hand and his ring on his left hand. At each turn the user is provided with a left or right vibration to indicate turn left or right, etc. Either vibrating or no haptic feedback can indicate that the user should proceed straight ahead.

In a further example, the user is playing a video soccer game on his mobile device. Wearable device haptic manager 110 maps the haptic effects generated in the game to the appropriate remote wearable device 120, 130 according to game events such as kicking the ball or making a goal. For example, a header may be simulated via haptic effects generated in the user's glasses.

In another example, the user is playing a videogame console system and has picked up a specialty gaming controller. Wearable device haptic manager 110 is aware of the networked device and routes all received haptic effects from the user's mobile phone to the gaming controller.

In another example, the user has a bracelet on his wrist that has a haptic array of actuators. A complex haptic effect that for example flows from right to left, is to be output/displayed to the user. For the user's wrist, the appropriate sensitivity and active element spacing is chosen to best convey this flow based on the perceptual human threshold. However, if on the next day the same wearable device is worn on the ankle or any other body area of the user, and the same haptic effect output is desired, wearable device haptic manager 110 will adjust (i.e., increase) the intensity and spacing of the active haptic elements so that the ankle or other body area can best perceive the flow of the haptic effect.

Figure 4:
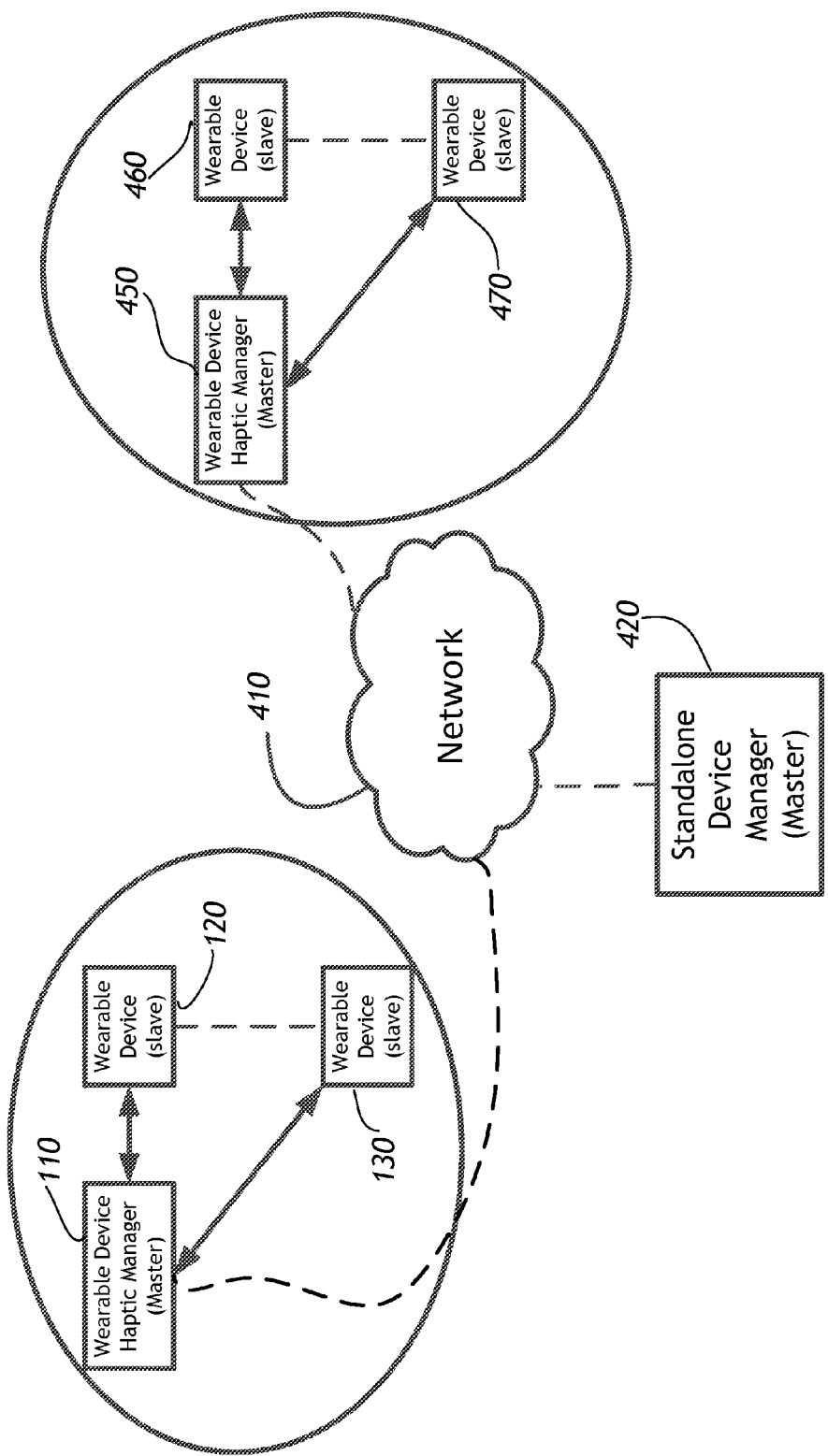
FIG. 4 is a block diagram illustrating a system that includes a standalone device manager that can control remote wearable devices via wearable device haptic managers in accordance with one embodiment of the present invention.

In another embodiment, a standalone device manager can remotely manage multiple wearable device haptic managers, which in turn can manage wearable devices worn by a corresponding user. FIG. 4 is a block diagram illustrating a system 400 that includes a standalone device manager 420 that can control remote wearable devices 120, 130, 460, 470 via wearable device haptic managers 110, 450 in accordance with one embodiment of the present invention. Standalone device manager 420 is coupled to wearable device haptic managers 110, 450 via a network 410. Network 410 may be any type of wired or wireless connection.

In one embodiment, standalone device manager 420 can be considered a standalone device with no communication to other standalone devices and that requires a local haptic manager (e.g., haptic manager 110). In another embodiment, standalone device manager 420 is self-aware of the capabilities that it has, and can communicate this to other devices. In another embodiment, standalone device manager 420 controls peripheral devices and can communicate and network with other self-aware standalone device and/or other devices that are in charge of other slave devices.

When standalone device manager 420 is self-aware, it can determine, for example, if and where it is being worn on the user (e.g., wrist, ankle, etc.) and depending on the location can appropriately adjust the flow of information and haptic output. For example, a cell phone can be considered a standalone device with a wearable manager and can determine what type of haptic output will be conveyed to the user depending on whether it is held by the hand or worn around the arm. Further, this cellphone having a standalone wearable manager and being worn on the left arm can interact with other standalone devices such as a pedometer-watch worn on the right arm. The cell phone may also have a navigation program and will display or command haptic effects on itself or on the watch to signal, for example, left or right turns. The cell phone can command a haptic effect on the watch and indicate precisely what effect to play, or the cellphone can command a type of effect that will be further customized by the watch through the watch's wearable manager.

As disclosed, in one embodiment a wearable device haptic manager determines the haptic capabilities of all wearable devices on a user, determines the human perceptual limits of each device, determines the intent of haptic information, and then selects one or more of the wearable devices that will output a haptic effect. Therefore, haptic effects can be coordinated among multiple wearable devices, and the most effective wearable devices can be selected for outputting the haptic effects. Further, other information, such as audio or video data, can be similarly routed to one or more wearable devices.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage a plurality of wearable haptic devices on a user, the managing comprising:
   receiving information to be conveyed using haptic effects;
   determining an intent of the information;
   determining for each of the plurality of wearable haptic devices, a location of the wearable haptic device on the user, a haptic capability for each of the locations on the user and a perceptual human threshold for each of the locations; and
   mapping the information as a haptic effect to one or more of the wearable haptic devices by selecting a subset of the plurality of wearable haptic devices to generate the haptic effects based at least on the determined locations on the user, the perceptual human threshold for each of the locations, and the haptic capabilities of each of the wearable haptic devices;
   wherein the plurality of wearable haptic devices are each discrete devices, each configured to be located on any of a plurality of different body parts,
   wherein a first wearable haptic device is located on a first body part of the user, and a second wearable haptic device is located on a second body part of the user that is different from the first body part;
   wherein the mapping comprises a determination to generate the haptic effects on either the first body part or the second body part;
   wherein the first wearable haptic device comprises a self-aware capability to determine its location on the user without communicating with the other wearable haptic devices, and wherein the first wearable haptic device performs the mapping.

2. The non-transitory computer readable medium of claim 1, further comprising adjusting at least one of an intensity of the haptic effects or a spacing of the haptic effects to correspond to the determined perceptual human threshold for the selected subset of the plurality of wearable haptic devices.

3. The non-transitory computer readable medium of claim 1, wherein determining the haptic capability comprises determining types of available haptic effects.

4. The non-transitory computer readable medium of claim 3, wherein the types of available haptic effects comprise at least one of: vibration, pressure, texture, temperature changes or deformation.

5. The non-transitory computer readable medium of claim 1, wherein determining the haptic capability comprises determining types of actuators in each wearable haptic device.

6. The non-transitory computer readable medium of claim 1, the managing further comprising:
determining a status of each of the plurality of wearable haptic devices, wherein each discrete wearable haptic device determines its worn location on the user.

7. The non-transitory computer readable medium of claim 1, wherein the intent comprises at least one of: an alert, a notification, background information or directional information.

8. The non-transitory computer readable medium of claim 1, the managing further comprising:
receiving audio or video data;
routing the audio or video data to one or more of the wearable haptic devices.

9. The non-transitory computer readable medium of claim 1, wherein the receiving information to be conveyed using haptic effects is received from a standalone device manager.

10. The non-transitory computer readable medium of claim 1, wherein the plurality of wearable haptic devices are not directly physically coupled to each other.

11. A wearable device manager in communication with one or more wearable devices, the wearable device manager comprising:
a processor;
a memory storing instructions that when executed by the processor manage the wearable devices;
wherein the processor, in response to receiving information to be conveyed:
determines an intent of the information;
determines, for each of the wearable devices, a location of the wearable device on a user, a haptic capability for each of the locations on the user and a perceptual human threshold for each of the locations; and
maps the information to one or more of the wearable devices by selecting a subset of the plurality of wearable haptic devices to generate the haptic effects based at least on the determined locations on the user, the perceptual human threshold for each of the locations, and the capabilities of each of the wearable haptic devices;
wherein the plurality of wearable devices are each discrete devices, each configured to be located on any of a plurality of different body parts,
wherein a first wearable device is located on a first body part of the user, and a second wearable device is located on a second body part of the user that is different from the first body part;
wherein the mapping comprises a determination to generate the haptic effects on either the first body part or the second body part;
wherein the first wearable device comprises a self-aware capability to determine its location on the user without communicating with the other wearable devices, and
wherein the first wearable device performs the mapping.

12. The wearable device manager of claim 11, wherein the information is conveyed as a haptic effect, and the capability of the wearable device is a haptic capability.

13. The wearable device manager of claim 12, wherein the haptic capability comprises types of available haptic effects.

14. The wearable device manager of claim 13, wherein the types of available haptic effects comprise at least one of: vibration, pressure, texture, temperature changes or deformation.

15. The wearable device manager of claim 12, wherein the haptic capability comprises determining types of actuators in each wearable device.

16. The wearable device manager of claim 11, the processor further adjusting at least one of an intensity of the haptic effects or a spacing of the haptic effects to correspond to the determined perceptual human threshold for the selected subset of the plurality of wearable devices.

17. The wearable device manager of claim 11, the processor further determining a status of each of the wearable devices, wherein each discrete wearable device determines its worn location on the user.

18. The wearable device manager of claim 11, wherein the intent comprises at least one of: an alert, a notification, background information or directional information.

19. The wearable device manager of claim 11, wherein the information is conveyed as audio or video data, the processor routing the audio or video data to the one or more wearable devices.

20. The wearable device manager of claim 11, wherein the one or more wearable devices are not directly physically coupled to each other.

21. The wearable device manager of claim 11, wherein a standalone manager is in communication with the wearable device manager, and the standalone manager provides the information.

22. The wearable device manager of claim 21, wherein the standalone manager is in communication with one or more additional wearable device managers and the standalone manager manages all of the wearable device managers.

23. A computer implemented method for managing a plurality of wearable haptic devices on a user, the method comprising:
receiving information to be conveyed using haptic effects;
determining an intent of the information;
determining for each of the plurality of wearable haptic devices, a location of the wearable haptic device on the user, a haptic capability for each of the locations on the user and a perceptual human threshold for each of the locations; and
mapping the information as a haptic effect to one or more of the wearable haptic devices by selecting a subset of the plurality of wearable haptic devices to generate the haptic effects based at least on the determined locations on the user, the perceptual human threshold for each of the locations, and the haptic capabilities of each of the wearable haptic devices;
wherein the plurality of wearable haptic devices are each discrete devices, each configured to be located on any of a plurality of different body parts, wherein a first wearable haptic device is located on a first body part of the user, and a second wearable haptic device is located on a second body part of the user that is different from the first body part;

wherein the mapping comprises a determination to generate the haptic effects on either the first body part or the second body part;

wherein the first wearable haptic device comprises a self-aware capability to determine its location on the user without communicating with the other wearable haptic devices, and wherein the first wearable haptic device performs the mapping.

24. The computer implemented method of claim 23, further comprising adjusting at least one of an intensity of the haptic effects or a spacing of the haptic effects to correspond to the determined perceptual human threshold for the selected subset of the plurality of wearable haptic devices.

25. The computer implemented method of claim 23, wherein determining the haptic capability comprises determining types of available haptic effects.

26. The computer implemented method of claim 25, wherein the types of available haptic effects comprise at least one of: vibration, pressure, texture, temperature changes or deformation.

27. The computer implemented method of claim 23, wherein determining the haptic capability comprises determining types of actuators in each wearable haptic device.

28. The computer implemented method of claim 23, further comprising:

determining a status of each of the plurality of wearable haptic devices, wherein each discrete wearable haptic device determines its worn location on the user.

29. The computer implemented method of claim 23, wherein the intent comprises at least one of: an alert, a notification, background information or directional information.

30. The computer implemented method of claim 23, further comprising:

receiving audio or video data; and routing the audio or video data to one or more of the wearable haptic devices.

31. The computer implemented method of claim 23, wherein the receiving information to be conveyed using haptic effects is received from a standalone device manager.

32. The computer implemented method of claim 23, wherein the plurality of wearable haptic devices are not directly physically coupled to each other.

* * * * *